United States Patent
Dillman

(10) Patent No.: US 7,661,516 B2
(45) Date of Patent: Feb. 16, 2010

(54) PNEUMATICALLY ACTUATED CLUTCH

(75) Inventor: Jeff Dillman, Ames, IA (US)

(73) Assignee: Trimble Navigation Limited, Sunnyvale, CA (US)

( * ) Notice: Subject to any disclaimer, the term of this patent is extended or adjusted under 35 U.S.C. 154(b) by 331 days.

(21) Appl. No.: 11/306,654

(22) Filed: Jan. 5, 2006

(65) Prior Publication Data

US 2007/0151824 A1    Jul. 5, 2007

(51) Int. Cl.
  F16D 25/04   (2006.01)
  F16D 25/08   (2006.01)
  F16D 13/02   (2006.01)

(52) U.S. Cl. .................. 192/23; 192/26; 192/85 AT; 192/88 R

(58) Field of Classification Search .............. 192/23, 192/26
  See application file for complete search history.

(56) References Cited

U.S. PATENT DOCUMENTS

| 3,905,458 | A | * | 9/1975 | Mehrbrodt | 192/26 |
| 3,979,975 | A | * | 9/1976 | Schulman | 74/815 |
| 3,986,589 | A | * | 10/1976 | Ochi et al. | 192/88 B |
| 4,646,894 | A | * | 3/1987 | Kamio | 192/85 AA |
| 5,439,083 | A | * | 8/1995 | Brock et al. | 192/70.2 |
| 5,967,066 | A | | 10/1999 | Giles et al. | |
| 6,308,812 | B1 | * | 10/2001 | Eike et al. | 192/85 R |
| 6,516,733 | B1 | | 2/2003 | Sauder et al. | |
| 7,140,310 | B2 | | 11/2006 | Mayerle et al. | |
| 7,374,029 | B1 | * | 5/2008 | Dillman | 192/30 R |
| 7,374,030 | B1 | * | 5/2008 | Dillman | 192/30 R |
| 7,395,769 | B2 | | 7/2008 | Jensen | |
| 2007/0151492 | A1 | * | 7/2007 | Dillman | 111/200 |
| 2008/0156239 | A1 | * | 7/2008 | Dillman | 111/177 |
| 2008/0161160 | A1 | * | 7/2008 | Dillman | 477/174 |

FOREIGN PATENT DOCUMENTS

JP    57-184727 A    *    11/1982

OTHER PUBLICATIONS

Layton W. Jensen; Individual Row Shut-Down Control Of Farm Implements To Eliminate Overlap In Irregularly Shaped Areas Of Application; filed Oct. 21, 2004, U.S. Appl. No. 10/970,053; United States Patent and Trademark Office.

* cited by examiner

Primary Examiner—Richard M. Lorence

(57) ABSTRACT

A clutch assembly having a drive shaft operably connected to a first hub or clutch plate. A second hub or clutch plate adjacent to the first clutch plate and operably connected to a second drive shaft. A release ring positioned to selectively release both clutch plates. Positioned to engage the release ring is a pneumatic actuating member that is operably connected to a source of compressed air.

5 Claims, 4 Drawing Sheets

PNEUMATICALLY ACTUATED CLUTCH

BACKGROUND OF THE INVENTION

This invention is directed toward a clutch that requires a small amount of current to actuate, and more specifically to a clutch that is actuated pneumatically.

Clutches are well known in the art and are used on a variety of mechanical devices. Typically, clutches are actuated either mechanically or electrically such as with a solenoid or the like. In some systems, particularly low current systems, the amount of current required to actuate the clutch limits the number of clutches that may be used in a system. For example, for a typical corn planter, a solenoid requires approximately 30 amps to pull a piston to engage a release ring, and approximately 1 amp to hold the piston in engagement. As a result, based on the limitations of the electrical system, one clutch is used to activate several corn planters. With the advent of GPS, this creates inefficiencies in planting where independent control of each planter is desired. Therefore, a need exists in the art for a device that addresses these deficiencies.

An object of the present invention is to provide a pneumatically actuated clutch.

A further objective of the present invention is to provide a clutch that is actuated by a reduced amount of current.

These and other objectives will be apparent to those skilled in the art based on the following written description.

SUMMARY OF THE INVENTION

A clutch assembly having a drive shaft operably connected to a first hub or clutch plate. A second hub or clutch plate adjacent to the first clutch plate and operably connected to a second drive shaft. A release ring positioned to selectively release both clutch plates. Positioned to engage the release ring is a pneumatic actuating member that is operably connected to a source of compressed air.

DETAILED DESCRIPTION OF THE PREFERRED EMBODIMENT

Figure 1:
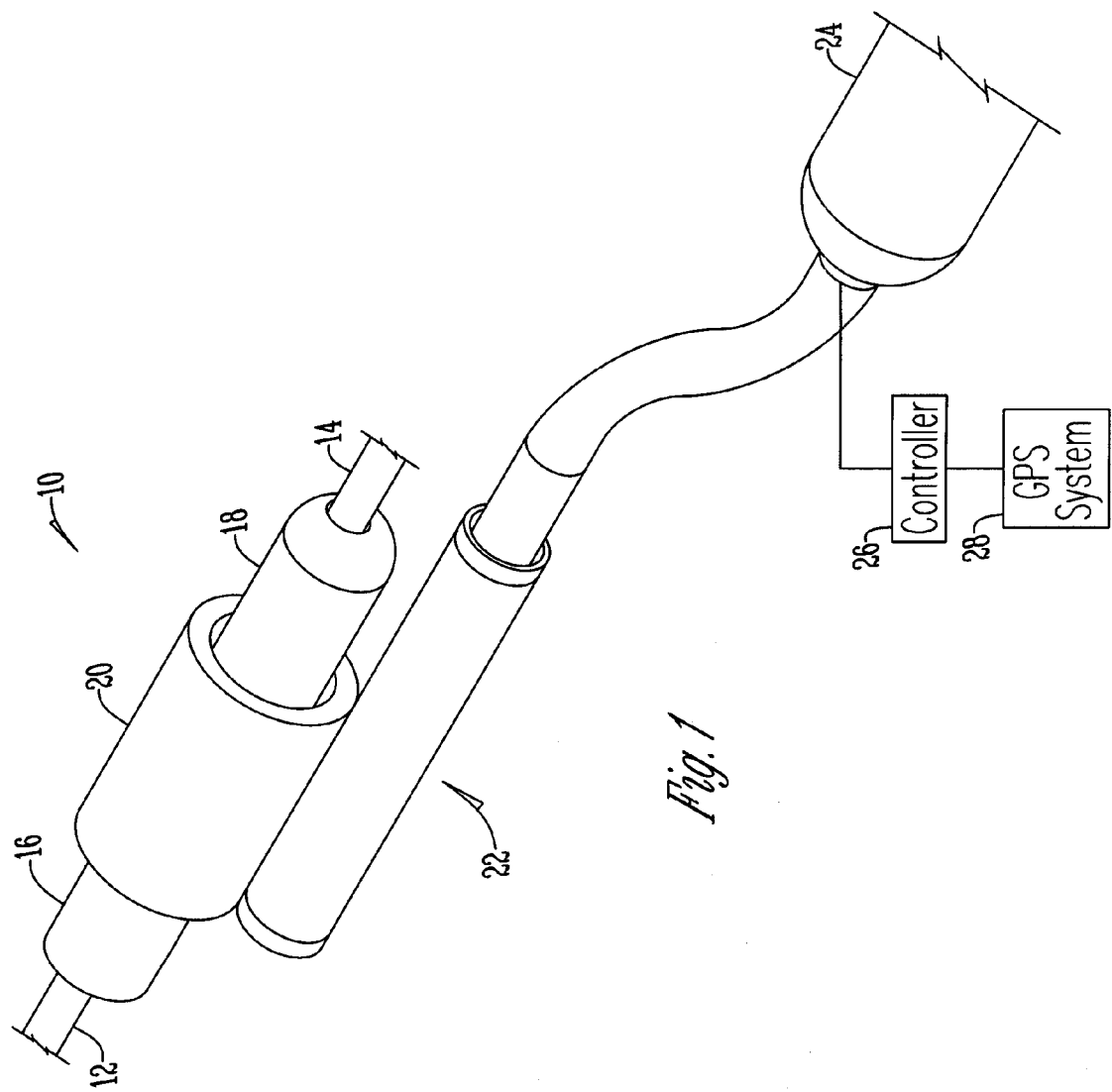
FIG. 1 is a perspective view of a pneumatic clutch assembly.
Figure 2:
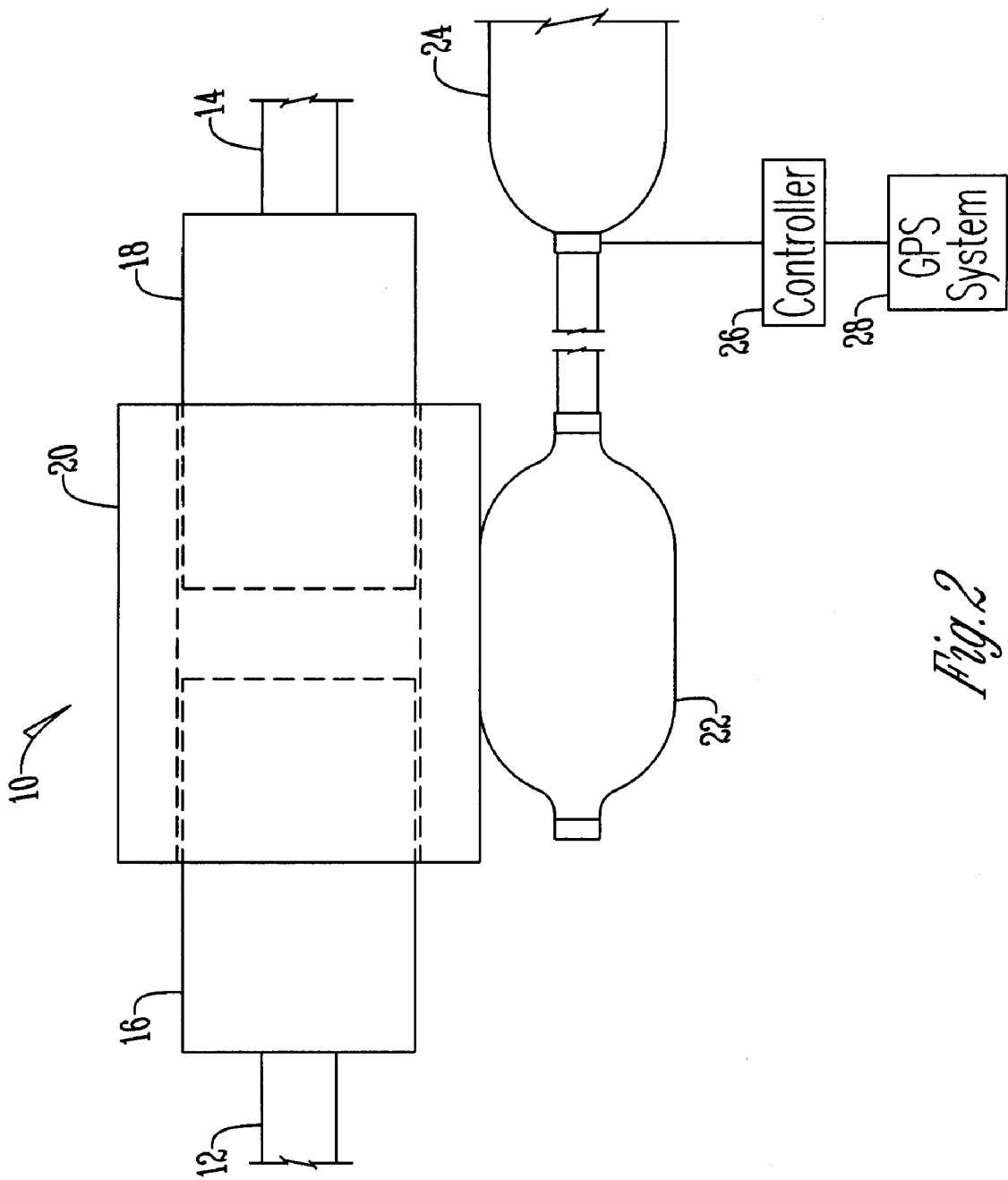
FIG. 2 is a side view of a pneumatic clutch assembly.
Figure 3:
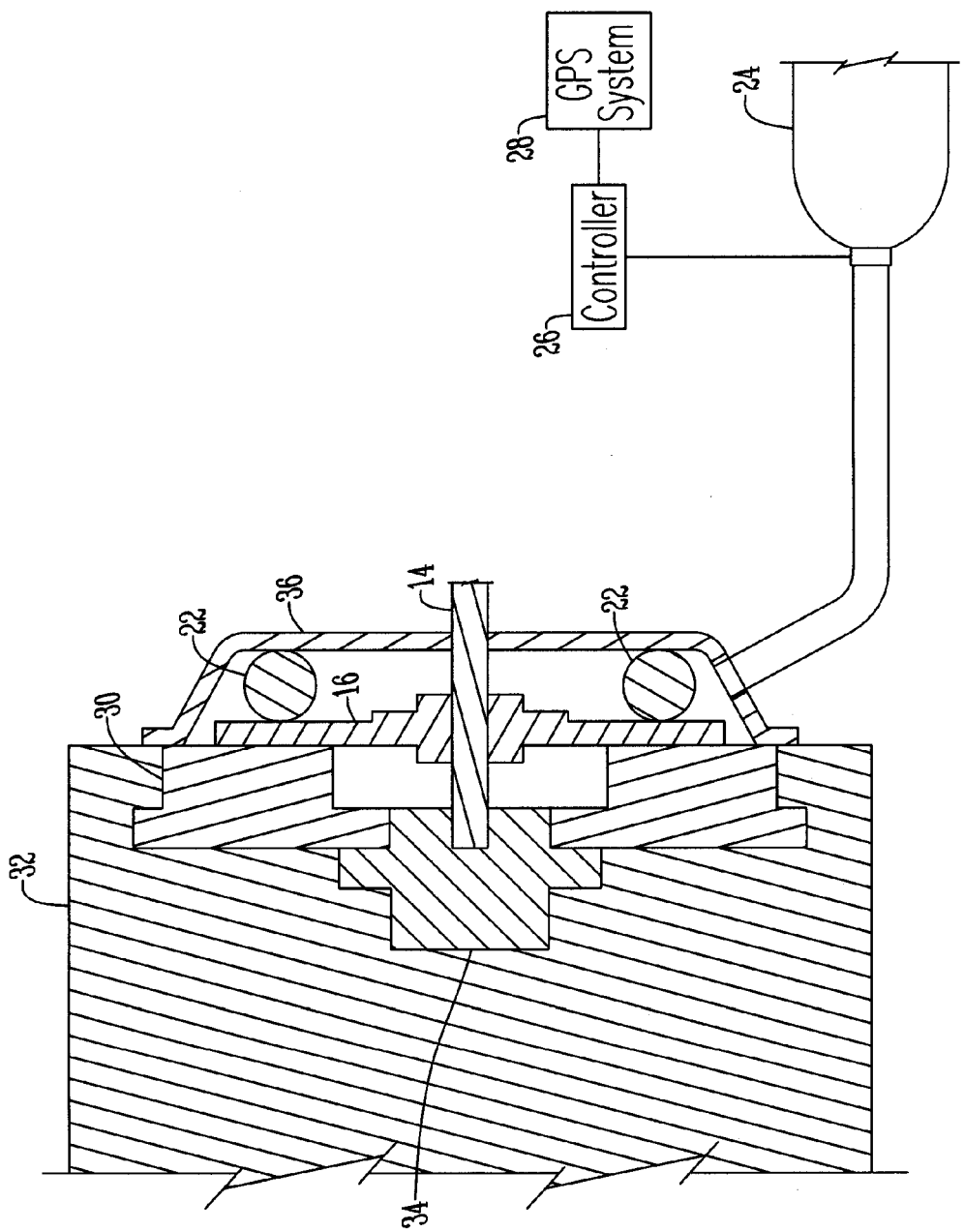
FIG. 3 is a side sectional view of an alternative pneumatic clutch assembly.
Figure 4:
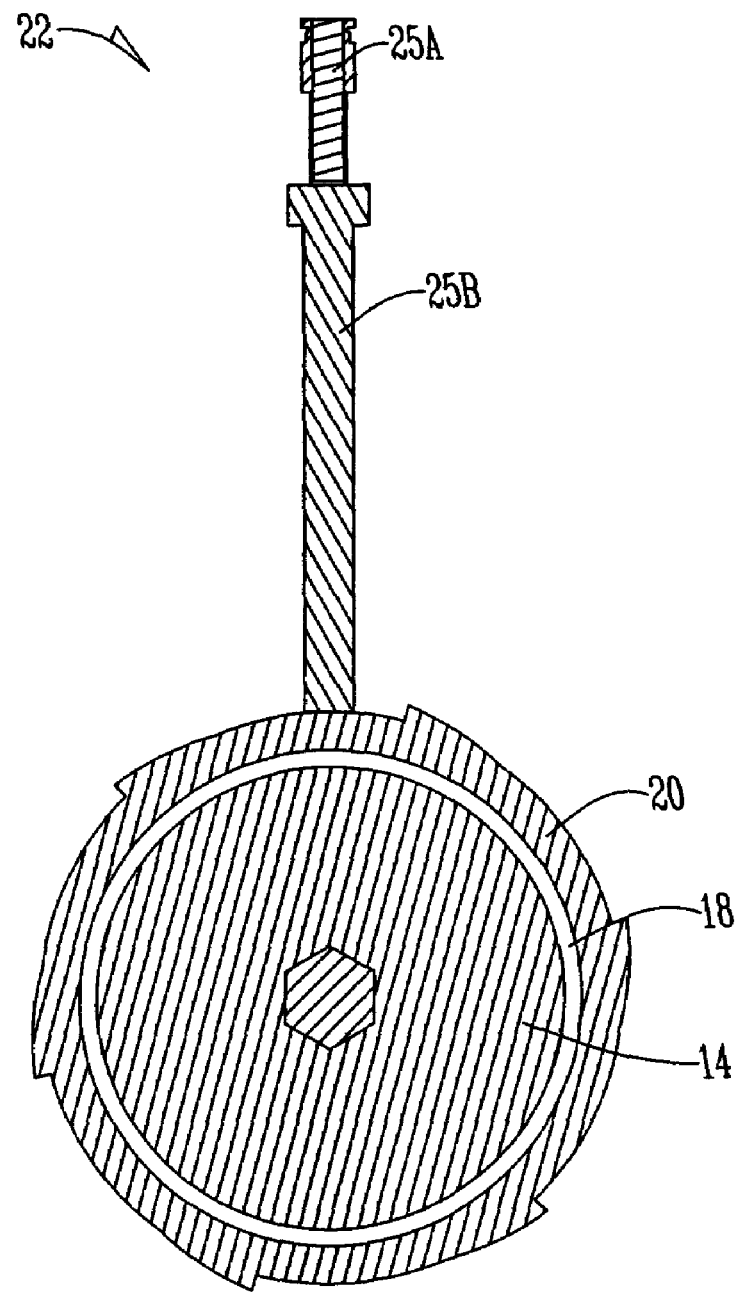
FIG. 4 is a side sectional view of an alternative pneumatic clutch assembly.

Referring to the Figures the pneumatically actuated clutch is generally referred to by reference numeral 10. The clutch may be of any shape, size, and structure and used for a variety of applications including use with automobiles, air conditioners, chainsaws, farm implements, and the like. The following description is of a clutch used with a corn planter and is used for illustration purposes only and is not intended to limit the invention in any manner.

The clutch 10 has a pair of drive shafts 12, 14, that are operatively connected to a first 16 and a second 18 hub or clutch plate. One drive shaft 12 is operably driven by a motor or pulley (not shown) and the other shaft is operatively connected to an operating device such as a corn planter (not shown). The first and second clutch plates 16 and 18 are adjacent to one another and are partially received by a torsion spring (not shown) which in a natural state is compressed against hubs 16 and 18 such that they rotate together. Surrounding the torsion spring is a release ring 20.

Positioned to selectively engage the release ring 20 is a pneumatic actuating member 22. The actuating member 22 is of any size, shape, and structure that permits expansion to engage the release ring 20. One example of an actuating member 22 is a rubber tube that is operatively connected to a source of compressed air 24. Alternatively, the actuating member 22 is an air bag connected to a source of compressed air 24 or an air cylinder 25A that activates a piston 25B that engages ring 20. Preferably, the actuating member 22 expands approximately 300% under 35 PSI and has a compound on the members 22 outer surface that becomes sticky as the member expands to better engage the release ring 20.

The source of compressed air 24 is of any type including a 12V portable compressor mounted to a vehicle or a rechargeable portable tank without a compressor. The source of compressed air 24 may be electrically connected to a controller 26 that sends a signal to activate the source of compressed air 24 which in turn activates the pneumatic actuating member 22. The controller 26 may be wirelessly connected to a GPS system 28 to permit activation based on geographic location.

In operation the motor or pulley rotates drive shaft 12 which in turn rotates hub 16. In a non-actuated state clutch plate 18 and shaft 14 rotate together. To activate, an operator either manually activates the source of compressed air 24 or the source of compressed air is activated by a signal received from the controller 26. Once activated, compressed air is released and provided to the pneumatic actuating member 22 which causes member 22 to engage the release ring 20. When engaged by the member 22, the release ring 20 frictionally engages the torsion spring such that the hubs 16 and 18 are rotatably released and do not rotate together. This arrangement requires approximately 15 milliamps of current.

In another example, such as a clutch 10 used for an automobile, a flywheel 30 is mounted to an engine 32. A drive shaft 14 is received in a hub 34 and extends outwardly therefrom. Mounted about shaft 14 and positioned to engage the flywheel 30 is a clutch plate 16. Positioned to engage the clutch plate 16 is a pneumatic actuating member 22 that is operably connected to a source of compressed air 24. The actuating member 22 is mounted within a clutch cover 36. To actuate the clutch 10 compressed air is released from the source of compressed air 24 to the actuating member 22. The released air fills the actuating member 22 such that the member 22 expands pressing clutch plate 16 into frictional engagement with the flywheel 30.

Therefore, a pneumatic actuated clutch has been shown that, at the very least, meets all the stated objectives.

What is claimed is:

1. A clutch assembly, comprising:
   a first drive shaft operably connected to a first hub;
   a second drive shaft operably connected to a second hub;
   the first and second hubs positioned adjacent to one another;
   a release ring that surrounds a portion of the first and second hubs and is positioned to selectively release the first and the second hubs; and
   a pneumatic actuating member operably connected to a source of compressed air and positioned to selectively engage the release ring wherein the pneumatic actuating member activates a piston that engages the release ring.

2. The assembly of claim 1 wherein the source of compressed air is connected to a controller which sends a signal to selectively release air from the source of compressed air to the actuating member.

3. The assembly of claim 2 wherein the controller is connected to the actuating member for activating the clutch assembly based upon geographic locations.

4. A clutch assembly, comprising:
   a first drive shaft operably connected to a first hub;
   a second drive shaft operably connected to a second hub;
   the first and second hubs positioned adjacent to one another;
   a release ring that surrounds a portion of the first and second hubs and is positioned to selectively release the first and the second hubs; and
   a pneumatic actuating member positioned to selectively engage the release ring wherein the assembly uses less than 1 amp of current.

5. The assembly of claim 4 wherein the actuating member is positioned to engage the release ring with approximately 15 milliamps of current.

* * * * *